United States Patent [19]

Matsuda et al.

[11] 4,337,652

[45] Jul. 6, 1982

[54] TIRE PRESSURE DROP DETECTING APPARATUS

[75] Inventors: Akira Matsuda, Higashi Murayama; Yoshihiro Hayakawa, Akigawa; Shigeo Yasuda, Musashino; Motoaki Iwasaki, Musashino; Hiroshi Nishino, Musashino, all of Japan

[73] Assignees: Bridgestone Tire Company Limited; Mitaka Instrument Company Limited, both of Tokyo, Japan

[21] Appl. No.: 157,983

[22] Filed: Jun. 9, 1980

[30] Foreign Application Priority Data

Jun. 15, 1979 [JP] Japan .......................... 54-082412[U]

[51] Int. Cl.³ ............................................. B60C 23/04
[52] U.S. Cl. ............................... 73/146.5; 200/61.25; 340/58
[58] Field of Search .................... 73/146.5; 200/61.22, 200/61.25; 340/58

[56] References Cited

U.S. PATENT DOCUMENTS 3,614,732 10/1971 Lejeune .
4,180,795 12/1979 Matsuda et al. ...................... 340/58
4,254,398 3/1981 Matsuda et al. ...................... 340/58

FOREIGN PATENT DOCUMENTS 49-38275 4/1974 Japan .
50-20436 7/1975 Japan .

*Primary Examiner*—Charles A. Ruehl
*Attorney, Agent, or Firm*—Cushman, Darby & Cushman

[57] ABSTRACT

An apparatus for detecting a pressure drop in a tire chamber of a tire-and-wheel assembly for an automotive vehicle, comprising an oscillator assembly held stationary with respect to the vehicle body structure and a resonator assembly mounted on the wheel rim of the tire-and-wheel assembly, wherein the resonator assembly comprises a resonant inductor and a resonant capacitor which are electrically connected together across a pressure-sensitive switch unit directly communicating with the tire chamber and which are positioned together with a portion of the switch unit within a protective receptacle secured to the wheel rim and wherein the resonant inductor and capacitor and the portion of the switch unit are encapsulated in a body of potting compound forming a potted resonance circuit structure within the protective receptacle, the switch unit and the resonant capacitor being positioned intermally of the resonant inductor.

23 Claims, 3 Drawing Figures

TIRE PRESSURE DROP DETECTING APPARATUS

FIELD OF THE INVENTION

The present invention relates to a tire-and-wheel assembly of a vehicle and, particularly, to an apparatus for detecting a pressure drop in a tire chamber of a tire-and-wheel assembly including a wheel rim rotatable about the axis of rotation of an axle of an automotive vehicle and a tubeless pneumatic tire fitted to the wheel rim. More particularly, the present invention relates to a pressure drop detecting apparatus of the electromagnetic induction type which uses an electric oscillator assembly held stationary with respect to the body structure of a vehicle and an electric resonator assembly mounted on a tire-and-wheel assembly of the vehicle.

BACKGROUND OF THE INVENTION

In a pressure drop detecting apparatus of the electromagnetic induction type, the resonator assembly mounted on a tire-and-wheel assembly or, particularly, the wheel rim forming part of the tire-and-wheel assembly comprises a pressure-sensitive switch unit which is arranged to be responsive to the pressure of the compressed air in the tire chamber and which is electrically connected between a resonant inductor and a resonant capacitor. The resonance circuit thus constituted by the resonant inductor and capacitor electrically connected together across the pressure-sensitive switch unit is responsive to the electromagnetic wave radiant from the oscillator assembly when the tire-and-wheel assembly rotating about the center axis of the wheel rim assumes a predetermined angular position with respect to the oscillator assembly which is held stationary with respect to the vehicle body structure. In response to the electromagnetic wave emitted from the oscillator assembly, an electric current is induced in the resonance circuit if the pressure-sensitive switch unit intervening between the resonant inductor and capacitor constituting the resonance circuit is closed. The pressure-sensitive switch unit is adapted to be closed in response to an air pressure higher than a predetermined acceptable value and to be open in response to an air pressure lower than the predetermined acceptable value. When the pressure of air in the tire-and-wheel assembly carrying the resonator assembly is higher than the predetermined acceptable value, a current is produced in the resonator assembly each time the tire-and-wheel assembly makes a full turn about the center axis of the wheel rim during cruising of the vehicle. The induction of a current in the resonator assembly results in a normal decrement in the energy of the electromagnetic wave radiant from the oscillator assembly, which thus produces a signal representative of such a normal decrement. The signal produced by the oscillator assembly is delivered to a signal processing unit connected to suitable output means such as a display or warning device and holds the display or warning device inoperative. In the event the pressure of the air in the tire chamber drops unusually due to, for example, a puncture of the tire, the pressure-sensitive switch unit incorporated in the resonator assembly is made open so that the resonant inductor and capacitor of the resonator assembly are electrically disconnected from each other and are disabled from producing a current in response to the electromagnetic wave radiant from the oscillator assembly. As a consequence, the oscillator assembly produces a signal indicative of the elimination of a normal decrement in the energy of the electromagnetic wave from the oscillator assembly and causes the signal processing unit to actuate the display or warning device to produce a sound or luminant signal.

In a prior-art pressure drop detecting apparatus of the electromagnetic induction type such as, for example, the apparatus taught in Japanese Patent Publication No. 50-20436, the pressure-sensitive switch unit is mounted, together with the associated resonant inductor and capacitor, on the wheel rim of a tire-and-wheel assembly and is arranged to be in communication with the tire chamber through a tube connected to the air injection valve attached to the wheel rim. In another known pressure drop detecting apparatus of the electromagnetic induction type such as the apparatus disclosed in Japanese Utility Model Publication No. 49-38275, the pressure-sensitive switch unit and the air injection valve of a tire-and-wheel assembly are constructed as a single structure and the resonant inductor and capacitor mounted on the wheel rim of the tire-and-wheel assembly are electrically connected across the switch unit by insulated wires which are exposed externally with no protective means provided therefor.

In prior-art pressure drop detecting apparatus of these natures, the tube interconnecting the pressure-sensitive switch unit and the air injection valve of the tire-and-wheel assembly or the insulated wires interconnecting the resonant inductor and capacitor across the pressure-sensitive switch unit is supported, without being protected, on the wheel rim of the tire-and-wheel which is subjected to serious weather and operating conditions during use of the tire-and-wheel assembly. For this reason, the resonator assembly of such a pressure drop detecting apparatus is liable to be damaged or fail earlier and is subject to various external disturbances which deteriorate the reliability of operation of the detecting apparatus per se.

Since, furthermore, the pressure-sensitive switch unit and the resonant inductor and capacitor of the resonator assembly of a prior-art pressure drop detecting apparatus of each of the above described natures are disposed separately of each other on the tire-and-wheel assembly, the apparatus as a whole has a disproportionately cumbersome and space-taking construction and the electrical coupling between the resonant inductor and capacitor tends to be considerably unstable.

The present invention contemplates elimination of these and other drawbacks which have been inherent in prior-art tire pressure drop detecting apparatus of the described characters.

It is, accordingly, an important object of the present invention to provide a tire pressure drop detecting apparatus featuring an improved resonator assembly in which the pressure-sensitive switch unit and the resonant inductor and capacitor are arranged compactly on a tire-and-wheel assembly and are reliably protected from the serious weather and operating conditions to which the tire-and-wheel assembly is to be subjected when in use.

It is another important object of the present invention to provide a tire pressure drop detecting apparatus which is reliable in operation and which will provide a prolonged service life.

It is still another important object of the present invention to provide a tire pressure drop detecting apparatus featuring a resonator assembly in which the resonant inductor and capacitor forming part of the resonator assembly are electrically coupled reliably and which can be resonantly coupled with an oscillator assembly efficiently and effectively when the apparatus is in use.

It is, yet, still another important object of the present invention to provide a tire pressure drop detecting apparatus featuring an improved resonator assembly which is easy and economical to manufacture and to install.

SUMMARY OF THE INVENTION

In accordance with the present invention, these objects are accomplished in an apparatus for detecting a pressure drop in a tire chamber formed in a tire-and-wheel assembly including a wheel rim rotatable about a predetermined axis and an annular pneumatic tire fitted to the wheel rim, comprising an electric oscillator assembly fixedly positioned with respect to the predetermined axis, and an electric resonator assembly mounted on the wheel rim and arranged to be brought into face-to-face relationship to the oscillator assembly when the tire-and-wheel assembly assumes a predetermined angular position about the aforesaid predetermined axis, wherein the resonator assembly comprises a protective receptacle fast on the wheel rim and having a concavity open toward the oscillator assembly when the tire-and-wheel assembly assumes the aforesaid predetermined angular position; a pressure-sensitive switch unit responsive to a drop of the air pressure in the tire chamber below a predetermined value and including a casing structure fixedly positioned within the receptacle and a member projecting from the casing structure into the tire chamber through an opening in the wheel rim and formed with a passageway open into the tire chamber; a resonant inductor positioned within the receptacle; a resonant capacitor positioned within the receptacle and electrically connected to the resonant inductor across the switch unit; and a body of a dielectric potting compound securely held within the receptacle and having encapsulated therein the resonant inductor and capacitor and at least a portion of the casing structure of the switch unit. The resonant inductor consists of a resonant coil which is wound in a generally rectangular configuration when viewed in plan on a plane to be confronted by the oscillator assembly when the tire-and-wheel assembly assumes the aforesaid predetermined angular position about the aforesaid predetermined axis of the wheel rim. In this instance, the resonator assembly may further comprises an inner receptacle fixedly positioned within the cavity in the protective receptacle and having the aforesaid body of the potting compound secured therein so that the resonant coil, the resonant capacitor and at least a portion of the casing structure of the switch unit are fixedly positioned within the inner receptacle.

BRIEF DESCRIPTION OF THE DRAWING

The features and advantages of a pressure drop detecting apparatus according to the present invention will be more clearly and accurately appreciated from the following description taken in conjunction with the accompanying drawing, in which.

DESCRIPTION OF THE PREFERRED EMBODIMENT

Figure 1:
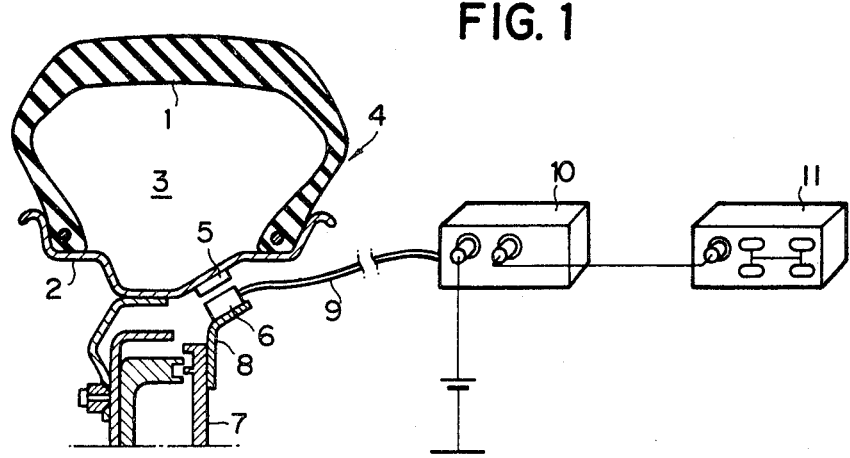
FIG. 1 is a sectional view showing partly in perspective the arrangement in which a tire pressure drop detecting device embodying the present invention is installed with the resonator assembly mounted on a tire-and-wheel assembly of an automotive vehicle.

Description will be hereinafter made regarding the preferred embodiment of the present invention with reference to FIGS. 1 to 3 of the drawing.

Referring first to FIG. 1 of the drawing, a tubeless pneumatic tire partially shown in cross section at 1 has its annular bead portions securely but detachably fitted to the respective outer faces of inner and outer flange portions of a wheel rim 2. The wheel rim 2 is welded or otherwise securely attached to a wheel disc bolted or otherwise securely connected to the hub of a road wheel as is well known in the art and has a center axis coincident with the axis of rotation of the road wheel.

The tire 1 and the wheel rim 2 have formed therebetween a tire chamber 3 filled with air under pressure and constitute in combination with each other a tire-and-wheel assembly 4. The wheel rim 2 has an annular well portion circumferentially extending intermediate between and along the inner and outer flange portions of the rim 2 and defining the radially inner end of the tire chamber 3. The well portion of the wheel rim 2 is in part inclined with respect to the center axis of the rim 2. The brake mechanism for the road wheel is herein assumed to be of the drum type by way of example and is thus shown including a brake drum bolted to the wheel hub. It will however be apparent that the tire-and-wheel assembly 4 illustrated in FIG. 1 may form part of a vehicle road wheel using disc-type wheel brake mechanism (not shown).

To the inclined outer face of the well portion of the wheel rim 2 is attached an electric resonator assembly 5 which is arranged to be operable for coacting with an electric oscillator assembly 6 mounted on a backing plate 7 by means of a bracket 8. The backing plate 7 is secured to the steering knuckle or the axle housing (not shown) and is accordingly held stationary with respect to the body structure of a vehicle. The resonator assembly 5 and the oscillator assembly 6 are arranged to be aligned with or located in face-to-face relationship to each other when the tire-and-wheel assembly 4 assumes about the center axis of the wheel rim 2 a predetermined angular position with respect to the backing plate 7 which is held stationary with respect to the vehicle body structure.

As shown schematically in FIG. 1, the oscillator assembly 6 is electrically connected by a coaxial cable 9 to a signal processing unit 10 adapted to detect from the signals delivered from the oscillator assembly 6 an unusual drop in the pressure of the compressed air in the tire chamber 3 when such a pressure drop takes place as a result of, for example, a puncture of the tire 1. The signal processing unit 10 in turn is electrically connected to suitable output means such as for example a display or warning device 11 positioned in the vicinity of the driver's seat of an automotive vehicle and adapted to produce a sound or luminant signal indicative of the occurrence of the puncture of the tire 1. The signal processing unit 10 and the display or warning device 11 to achieve these functions may be designed as desired by those skilled in the art and, for this reason, the detailed constructions and arrangements thereof are not herein described and shown.

Figure 2:
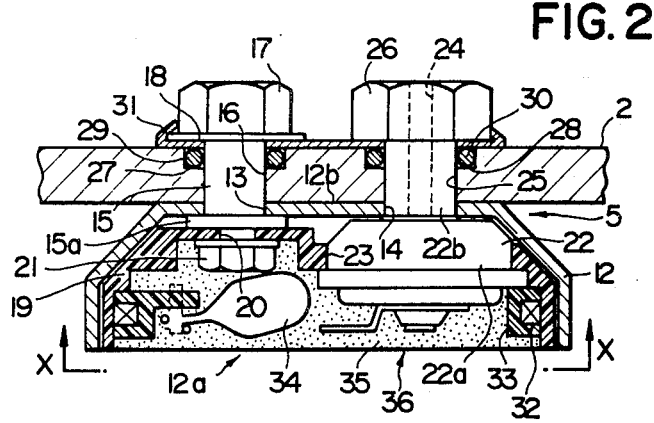
FIG. 2 is a cross sectional view of the resonator assembly forming part of the apparatus embodying the present invention.
Figure 3:
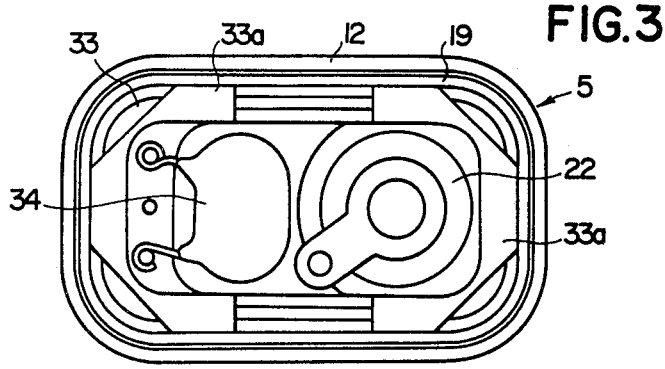
FIG. 3 is a plan view showing the resonator assembly viewed in a direction indicated by arrowheads X in FIG. 2.

Turning to FIGS. 2 and 3 of the drawing, the resonator assembly 5 mounted on the well portion of the wheel rim 2 comprises a generally trough-shaped protective outer receptacle 12 constructed of metal and having a largely rectangular cross section with curved or rounded corners as will be seen from FIG. 3. The protective outer receptacle 12 thus having two pairs of opposite and parallel side wall portions merging into one another through curved or rounded corner portions is open as at 12a (FIG. 2) so as to confront the stationary oscillator assembly 6 (FIG. 1) when the tire-and-wheel assembly 4 assumes about the center axis of the wheel rim 2 a predetermined angular position with respect to the backing plate 7 which is fast on the vehicle body structure. The receptacle 12 has a substantially flat base wall portion 12b formed with two circular openings 13 and 14 which are spaced apart from each other in a direction in which the trough-shaped receptacle 12 is elongated. The protective outer receptacle 12 thus shaped is securely fastened to the outer face of the well portion of the wheel rim 2 by means of a bolt assembly which comprises a bolt 15 having threaded opposite end portions (not shown) and an annular flange portion 15a located adjacent one of the threaded end portions. The bolt 15 is closely passed through the opening 13 in the base wall portion 12b of the receptacle 12 and further through a circular opening 16 formed in the well portion of the wheel rim 2. The cross sections of the openings 13 and 16 are thus substantially similar in measurement to the cross section of an intermediate stem portion of the bolt 15. One of the threaded end portions of the bolt 15, viz., the threaded end portion remote from the flange portion 15a of the bolt 15 axially projects from the opening 16 in the well portion of the wheel rim 2 into the tire chamber 3 (FIG. 1) and is fastened to the inner face of the well portion of the wheel rim 2 by means of a nut 17 engaging the threaded end portion with a plain steel washer 18 interposed between the well portion of the wheel rim 2 and the inner end face of the nut 17 as shown. The other of the threaded end portions of the bolt 15, viz., the threaded end portion adjacent the flange portion 15a of the bolt 15 axially projects from the opening 13 in the base wall portion of the protective outer receptacle 12 into the concavity in the receptacle 12 and has secured thereto a generally trough-shaped, concave inner receptacle 19 fixedly positioned within the protective outer receptacle 12 and constructed of a suitable rigid, electrically insulating material such as a rigid synthetic resin. The inner receptacle 19 has a side wall extending, when viewed in plan, in a generally rectangular closed-loop configuration which is substantially similar to the overall configuration of the side wall of the protective outer receptacle 12 and which is slightly smaller in measurement than the cross section of the concavity in the outer receptacle 12. Thus, the inner receptacle 19 has two pairs of opposite and parallel side wall portions merging into one another through curved or rounded corner portions and extending along the respectively corresponding side wall portions of the outer receptacle 12, as will be seen from FIG. 3. The inner receptacle 19 further has a base wall portion facing and substantially coextensive with the inner face of the base wall portion of the outer receptacle 12 and is formed with a circular opening 20 axially aligned with the opening 13 in the outer receptacle 12. The threaded end portion adjacent the flange portion 15a of the bolt 15 is passed through the opening 20 in the base wall portion of the inner receptacle 19 with the flange portion 15a closely fitted between the respective base wall portions of the outer and inner receptacles 12 and 19 and has the base wall portion of the inner receptacle 19 securely held thereto by means of a nut 21 engaging the threaded end portion adjacent the flange portion 15a. The inner receptacle 19 thus positioned fixedly within the concavity in the outer receptacle 12 has its base wall portion slightly spaced apart from the inner face of the base wall portion 12b of the outer receptacle 12 by the flange portion 15a of the bolt 15 and its four side wall portions slightly spaced apart inwardly from the respective inner faces of the four side wall portions of the outer receptacle 12 as will be seen from FIGS. 2 and 3. The opening 20 in the base wall portion of the inner receptacle 19 is shown to be smaller than the opening in the well portion of the wheel rim 2 and accordingly the threaded end portion adjacent the flange portion 15a of the bolt 15 is assumed to be smaller in diameter than the other threaded end portion of the bolt 15. This is merely by way of example and thus the diameters of the threaded end portions of the bolt 15 and the diameters of the openings 13 and 20 in the outer and inner receptacles 12 and 19 and the opening 16 in the well portion of the wheel rim 2 may be selected arbitrarily insofar as the outer and inner receptacles 12 and 19 can be properly held together and securely fitted to the well portion of the wheel rim 2 by means of the bolt 15 and the nuts 17 and 21.

The resonator assembly 5 further comprises a pressure-sensitive switch unit 22 which is operative to be closed in response to an air pressure higher than a predetermined value and to be open in response to an air pressure lower than the predetermined value. The switch unit 22 comprises a casing structure 22a closely received in an opening 23 formed in the base wall portion of the inner receptacle 19 and which axially projects in part into the concavity in the inner receptacle 19 and in part toward the inner face of the base wall portion 12b of the inner receptacle 19. In this instance, it is important that the casing structure 22a of the switch unit 22 be slightly spaced apart from the inner face of the base wall portion 12a of the receptacle 12 as will be seen from FIG. 2. The switch unit 22 further comprises passageway means constituted by a tubular member 22b which is formed with an axial bore 24 open at the opposite ends of the tubular member 22b and which axially projects from the casing structure 22a into the tire chamber 3 through the opening 14 in the base wall portion 12b of the outer receptacle 12 and further through a circular opening 25 formed in the well portion of the wheel rim 2. The tubular member 22b has a threaded leading end portion (not shown) engaged by a nut 26 securing the tubular member 22b to the well portion of the wheel rim 2. The nut 26 is thus effective to have the protective outer receptacle 12 secured to the well portion of the wheel rim 2 in cooperation with the bolt 15 and the nut 17 and to have the switch unit 22 secured to the well portion of the wheel rim 2. The respective cross sections of the opening 14 in the outer receptacle 12 and the opening 25 in the well portion of the wheel rim 2 have diameters substantially equal to the outside diameter of the tubular member 22b, which is accordingly closely received in the openings 14 and 25.

The axial bore 24 in the tubular member 22b of the switch unit 22 thus arranged is open at one end thereof to the tire chamber 3 and at the other end to a slight space formed between the casing structure 22a of the switch unit 22 and the inner face of the base wall portion 12b of the protective outer receptacle 12, as will be seen from FIG. 2. The switch unit 22 is thus responsive to the pressure of the compressed air in the tire chamber 3 through the axial bore 24 in the tubular member 22b and is operative to remain closed when the air pressure in the tire chamber 3 is higher than a predetermined acceptable value and to be open when the air pressure in the tire chamber 3 is lower than the predetermined acceptable value.

The well portion of the wheel rim 2 is formed with annular depressions 27 and 28 which are open to the tire chamber 3 and which encircle the inner axial ends of the openings 16 and 25, respectively, in the wheel rim 2. In these depressions 27 and 28 are closely received suitable sealing elements such as O-rings 29 and 30, respectively, which hermetically seal the openings 16 and 25, respectively, in the well portion of the wheel rim 2 for preventing leakage of compressed air from the tire chamber 3 through the openings 16 and 25. If desired, a retainer plate 31 may be provided between the inner face of the well portion of the wheel rim 2 and the nut 26 and the plain washer 18 for the nut 17 as shown in FIG. 2 for thereby holding the O-rings 29 and 30 in position in the annular depressions 27 and 28, respectively, in the well portion of the wheel rim 2. The retainer plate 31 has opposite end portions turned back for retaining engagement with the nuts 17 and 26 and is thus effective not only to retain the O-rings 29 and 30 in the annular depressions 27 and 28, respectively, in the wheel rim 2 but to prevent the nuts 17 and 26 from turning on the threaded leading end portions of the bolt 15 and the tubular member 22b, respectively. The retainer plate 31 is formed with openings respectively having the tubular member 22b and the bolt 15 axially passed therethrough.

The resonator assembly 5 further comprises a potted resonance circuit structure positioned within the concavity in the inner receptacle 19. The potted resonance circuit structure comprises a resonant inductor constituted by a resonant coil 32 which is wound on a coil-carrying bobbin 33. The coil-carrying bobbin 33 has a continuous outer surface extending in a generally rectangular closed-loop configuration along and throughout the inner surface of the side wall of the inner receptacle 19. The resonant coil 32 is wound in flattened form on this continuous outer surface of the coil-carrying bobbin 33 and is, thus, wound in a generally rectangular closed-loop configuration substantially similar to the configuration of the side wall of the inner receptacle 19 and accordingly to the configuration of the protective outer receptacle 12 when viewed in plan on a plane to be confronted by the oscillator assembly 6 when the tire-and-wheel assembly 4 assumes about the center axis of the wheel rim 2 the previously mentioned predetermined angular position with respect to the backing plate 7 which is held stationary with respect to the vehicle body structure.

The coil-carrying bobbin 33 has a suitable number of lug portions 33a which are spaced apart from each other along the resonant coil 32 and each of which is formed with a groove open toward the inner face of the side wall of the inner receptacle 19. The resonant coil 32 has portions respectively received in the grooves in the individual lug portions 33a and is thereby snugly held in position between the above mentioned continuous outer surface of the coil-carrying bobbin 33 and the inner face of the side wall of the inner receptacle 19. In FIG. 3, the coil-carrying bobbin 33 is shown provided with six such lug portions consisting of two lug portions respectively adjacent the shorter side wall portions of the inner receptacle 19, two lug portions adjacent one of the longer side wall portions of the receptacle 19, and two lug portions adjacent the other longer side wall portion of the receptacle 19.

The above mentioned potted resonance circuit structure further comprises a resonant capacitor 34 having input and output terminals connected to electrodes mounted on the coil-carrying bobbin 33 and positioned within the concavity in the resonant coil 32. The pressure-sensitive switch unit 22 has terminal elements electrically connected between the resonant coil 32 and the resonant capacitor 34 by means of conductors (not shown) provided within the concavity in the receptacle 19 and constitutes, in combination with the resonant coil 32 and the resonant capacitor 34, an electric resonance circuit which is completed when the switch unit 22 is closed. The resonant coil 32 and the coil-carrying bobbin 33 which are mounted within the inner receptacle 19 and the switch unit 22 and the resonant capacitor 34 which are provided inside the coil and bobbin are all encapsulated in a body 35 of a suitable dielectric compound such as an epoxy resin cast in a substantially void-free fashion into the concavity in the inner receptacle 19 as shown in FIG. 2 and are thus integrated as a single unit 36 together with the inner receptacle 19. The body 35 of the potting compound has a substantially flat outer end face at the initially open end 12a of the protective outer receptacle 12.

Description will be hereinafter made with reference to FIGS. 1 to 3 of the drawings regarding the operation of the tire pressure drop detecting apparatus thus constructed and arranged.

When the vehicle is being driven with the road wheels rotating on a road surface, the tire-and-wheel assembly 4 is driven to rotate about the center axis of the wheel rim 2 with respect to the backing plate 7 which is held stationary with respect to the body structure of the vehicle. As the tire-and-wheel assembly 4 is thus rotated about the center axis of the wheel rim 2, the resonator assembly 5 mounted on the well portion of the wheel rim 2 is also rotated about the center axis of the wheel rim 2 with respect to the backing plate 7 and is thus brought into face-to-face relationship to the oscillator assembly 6 supported by the backing plate 7 each time the tire-and-wheel assembly 4 makes a full turn with respect to the vehicle body structure. If, in this instance, the pressure of air in the tire chamber 3 is higher than a predetermined acceptable value, the pressure-sensitive switch unit 22 is kept closed so that an electric current is induced in the resonant coil 32 of the resonator assembly 5 by the resonant coupling between the resonator and oscillator assemblies 5 and 6 each time the resonator assembly 5 is brought into face-to-face relationship to the oscillator assembly 6. The induction of the electric current in the resonant coil 32 causes a normal decrement in the energy of the electromagnetic wave radiant from the oscillator assembly 6. The decrement in the electromagnetic wave energy is converted into a corresponding signal delivered from the oscillator assembly 6 to the signal processing unit 10 through the coaxial cable 9. In response to the signal thus delivered from the oscillator assembly 6, the signal processing unit 10 supplies to the display or warning device 11 a signal effective to hold the display or warning device 11 inoperative, enabling the vehicle driver to confirm that the air pressure in the tire chamber 3 of the tire-and-wheel assembly 4 is higher than the predetermined acceptable value.

In the event the pressure of air in the tire chamber 3 happens to drop below the predetermined acceptable value due, for example, to the occurrence of a puncture in the tire 1, the pressure-sensitive switch unit 22 responds to such a pressure drop and is caused to open. The resonant coil 32 and the resonant capacitor 34 are thus disconnected from each other across the switch unit 22 so that the resonance circuit constituted by the switch unit 22 and the resonance coil and capacitor 32 and 34 is made inoperative. In the absence of an electric current in the resonator assembly 5, the resonant coupling between the resonator and oscillator assemblies 5 and 6 is destroyed and, as a consequence, there is no normal decrement in the energy of the electromagnetic wave radiant from the oscillator assembly 6. Under these conditions, the display or warning device 11 is actuated to produce a sound or luminant signal indicative of the occurrence of the puncture in the tire 1 in response to a signal supplied from the signal processing unit 10.

From the foregoing description it will have been appreciated that the resonator assembly of the tire pressure drop detecting apparatus proposed by the present invention provides the following advantages over prior-art counterparts:

(1) Because of the fact that the resonant coil 32 in the resonator assembly 5 is wound in a generally rectangular configuration which is elongated in the direction of rotation of the tire on which the resonator assembly is mounted, the electromagnetic wave radiant from the oscillation coil (not shown) forming part of the oscillator assembly 6 can be efficiently and effectively received by the resonant coil 32. For this reason, the resonator assembly 5 mounted on the tire-and-wheel assembly 4 to be driven for rotation and the oscillator assembly 6 mounted on the backing plate 7 which is held stationary with respect to the vehicle body structure can be spaced apart satisfactorily from each other.

(2) Since, furthermore, the pressure-sensitive switch unit 22 and the resonant capacitor 34 are disposed internally of the resonant coil 32 having a generally rectangular configuration similar to the configuration of the resonant coil 32 and since the inner receptacle 19 in turn is accommodated within the protective outer receptacle 12 having a generally rectangular configuration similar to the configuration of the inner receptacle 19, the resonator assembly 5 has an extremely compact and small-sized overall construction which can be easily mounted on the tire-and-wheel assembly 4 which is subject to irregular rotation and violent vibrations during cruising of the vehicle.

(3) Because the inner receptable 19 is slightly spaced apart from the entire inner faces of the protective outer receptacle 12, the potted circuit structure held in position within the inner receptacle 19 by means of the body 35 of the potting compound can be effectively isolated from the shocks and vibrations transferred from the tire-and-wheel assembly 4 to the protective outer receptacle 12 during cruising of the vehicle, especially when the vehicle encounters a bump or a hollow of a road.

(4) Since the resonance circuit as a whole is encapsulated in the body 35 of the dielectric compound and since the inner receptacle 19 supporting the potted resonance circuit structure is positioned in its entirety within the protective outer receptacle 12 which is constructed of metal, the resonance circuit is protected from the serious weather and operating conditions exerted on the tire-and-wheel assembly and is accordingly practically free from the external disturbances which would otherwise result from the existence of metallic members and structures located in the neighborhood of the resonator assembly 5 so that the resonator assembly 5 provides a stable resonant frequency characteristic and constant sharpness of resonance or Q-value. It will however be apparent that the protective outer receptacle of the resonator assembly in the apparatus according to the present invention may be constructed of any rigid material other than metal, if desired. If, in this instance, the protective outer receptacle is constructed of an electrically non-conductive material such as a rigid synthetic resin, the inner receptacle 19 may be dispensed with if the body 35 of the dielectric potting material forming part of the potted resonance circuit structure is formed directly in the concavity in the outer receptacle 12.

(5) Because of the fact that the pressure-sensitive switch unit 22 of the resonator assembly 5 is in direct and constant communication with the tire chamber 3 in the tire-and-wheel assembly 4 through the axial bore 24 in the tubular member 22b which forms part of the switch unit 22, the resonator assembly 5 is expected to provide a prolonged service life and an enhanced reliability of operation.

What is claimed is:

1. Apparatus for detecting a pressure drop in a tire chamber formed in a tire-and-wheel assembly including a wheel rim rotatable about a predetermined axis and an annular pneumatic tire fitted to the wheel rim, comprising:
an electric oscillator assembly fixedly positioned with respect to said predetermined axis, and
an electric resonator assembly mounted on said wheel rim and arranged to be brought into face-to-face relationship to said oscillator assembly when said tire-and-wheel assembly assumes a predetermined angular position about said predetermined axis,
wherein the resonator assembly comprises:
a protective receptacle fast on said wheel rim and having a concavity open toward said oscillator assembly when said tire-and-wheel assembly assumes said predetermined angular position;
a pressure-sensitive switch unit responsive to a drop of the air pressure in said tire chamber below a predetermined value and including a casing structure fixedly positioned within said receptacle and a member projecting from said casing structure into said tire chamber through an opening in said wheel rim and formed with a passageway open into the tire chamber;
a resonant capacitor positioned within said receptacle;
a resonant inductor positioned within the receptacle and electrically connected to said resonant capacitor across said switch unit; and
a body of dielectric potting compound securely held within said receptacle and having encapsulated therein the resonant inductor and capacitor and at least a portion of the casing structure of said switch unit,
in which said resonant inductor consists of a resonant coil which is wound in a generally rectangular configuration when viewed in plan on a plane to be confronted by said oscillator assembly when said tireand-wheel assembly assumes said predetermined angular position about said predetermined axis of the wheel rim said switch unit and said resonant capacitor being positioned internally of said resonant coil.

2. Apparatus as set forth in claim 1, in which said resonator assembly further comprises an inner receptacle fixedly positioned within said concavity in said protective receptacle and having said body of the potting compound secured therein so that said resonant coil, said resonant capacitor and at least a portion of the casing structure of said switch unit are fixedly positioned within said inner receptacle.

3. Apparatus as set forth in claim 2, in which said inner receptacle has a side wall extending, when viewed on said plane, in a generally rectangular closed-loop configuration substantially similar to said configuration in which said resonant coil is wound.

4. Apparatus as set forth in claim 3, in which said resonator assembly further comprises a coil carrying bobbin having a continuous outer surface extending along and throughout the inner face of the side wall of said inner receptacle and spaced apart inwardly from the inner face of said side wall, said resonant coil being wound on said outer surface of the coil-carrying bobbin and positioned between said outer surface of the coil-carrying bobbin and the inner face of the side wall of said inner receptacle.

5. Apparatus as set forth in claim 4, in which said coil-carrying bobbin has a plurality of lug portions which are spaced apart from each other along said resonant coil, each of said lug portions being formed with a groove open toward the inner face of the side wall of said inner receptacle, said resonant coil having portions respectively received in the grooves in the individual lug portions.

6. Apparatus as set forth in claim 3, in which said protective receptacle has a side wall extending in a generally rectangular closed-loop configuration substantially similar to said configuration of the side wall of said inner receptacle.

7. Apparatus as set forth in claim 6, in which said inner receptacle is slightly spaced apart from the inner faces of said protective receptacle.

8. Apparatus as set forth in any one of claims 2 through 7, inclusive, in which said inner receptacle is constructed of an electrically non-conductive material.

9. Apparatus as set forth in claim 8, in which said protective receptacle is constructed of metal.

10. Apparatus as set forth in any one of claims 2 through 7, inclusive, in which said protective receptacle has a base wall portion attached to the outer face of said wheel rim and in which said inner receptacle has a base wall portion spaced apart from the inner face of said base wall portion of the protective receptacle.

11. Apparatus as set forth in claim 10, in which said base wall portion of said inner receptacle is formed with an opening through which the casing structure of said switch unit is securely held in position within said inner receptacle.

12. Apparatus as set forth in claim 11, in which the casing structure of said switch unit projects from said opening in the base wall portion of the inner receptacle in part into said inner receptacle and in part toward the inner face of said base wall portion of the protective receptacle.

13. Apparatus as set forth in claim 12, in which the casing structure of said switch unit is slightly spaced apart from the inner face of said base wall portion of the protective receptacle.

14. Apparatus as set forth in claim 10, in which said resonator assembly further comprises fastening means for securing said protective receptacle and said inner receptacle to said wheel rim, said fastening means comprising a threaded portion constituted by a leading end portion of said member projecting into said tire chamber, a nut engaging said threaded portion for securing said member to said wheel rim, a bolt having threaded opposite end portions and closely passed through an opening formed in said wheel rim, an opening formed in said base wall portion of said protective receptacle and an opening formed in said base wall portion of said inner receptacle, one of said threaded opposite end portions projecting into said tire chamber and the other of the threaded opposite end portions projecting into said inner receptacle, and two nuts respectively engaging said threaded opposite end portions in said tire chamber and within said inner receptacle for securing said inner receptacle and said protective receptacle to said wheel rim.

15. Apparatus as set forth in claim 14, in which said bolt has an annular flange portion closely fitted between the respective base wall portions of said protective receptacle and said inner receptacle so that the base wall portion of the inner receptacle is spaced apart throughout its area from the inner face of the base wall portion of the protective receptacle.

16. Apparatus as set forth in claim 14, in which said wheel rim has two annular depressions axially open into said tire chamber and respectively encircling the axial ends of the openings formed in the wheel rim adjacent the nuts respectively engaging said member and said bolt inside said wheel rim.

17. Apparatus as set forth in claim 16, in which said resonator assembly further comprises two annular sealing elements respectively fitted in said annular depressions.

18. Apparatus as set forth in claim 17, in which said resonator assembly further comprises a retainer plate closely fitted between the inner face of said wheel rim and the nuts respectively engaging said member and said bolt inside said wheel rim, said retainer plate being in retaining engagement with said sealing elements.

19. Apparatus as set forth in claim 18, in which said retainer plate has opposite end portions turned back and held in retaining engagement with the nuts engaging said member and said bolt inside said wheel rim.

20. Apparatus as set forth in claim 15, in which said wheel rim has two annular depressions axially open into said tire chamber and respectively encircling the axial ends of the openings formed in the wheel rim adjacent the nuts respectively engaging said member and said bolt inside said wheel rim.

21. Apparatus as set forth in claim 20, in which said resonator assembly further comprises two annular sealing elements respectively fitted in said annular depressions.

22. Apparatus as set forth in claim 21, in which said resonator assembly further comprises a retainer plate closely fitted between the inner face of said wheel rim and the nuts respectively engaging said member and said bolt inside said wheel rim, said retainer plate being in retaining engagement with said sealing elements.

23. Apparatus as set forth in claim 22, in which said retainer plate has opposite end portions turned back and held in retaining engagement with the nuts engaging said member and said bolt inside said wheel rim.

* * * * *